(12) United States Patent
Fleishman et al.

(10) Patent No.: US 10,685,446 B2
(45) Date of Patent: Jun. 16, 2020

(54) METHOD AND SYSTEM OF RECURRENT SEMANTIC SEGMENTATION FOR IMAGE PROCESSING

(71) Applicant: Intel Corporation, Santa Clara, CA (US)

(72) Inventors: Shahar Fleishman, Hod Hasharon (IL); Naomi Ken Korem, Jerusalem (IL); Mark Kliger, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 15/870,608

(22) Filed: Jan. 12, 2018

(65) Prior Publication Data

US 2019/0043203 A1    Feb. 7, 2019

(51) Int. Cl.

| | |
|---|---|
| *G06T 7/174* | (2017.01) |
| *G06N 3/04* | (2006.01) |
| *G06T 7/55* | (2017.01) |
| *G06K 9/62* | (2006.01) |
| *H04N 13/261* | (2018.01) |
| *G06T 7/579* | (2017.01) |
| *G06T 7/73* | (2017.01) |
| *G06T 17/00* | (2006.01) |
| *G06K 9/46* | (2006.01) |
| *H04N 5/247* | (2006.01) |
| *G06K 9/00* | (2006.01) |

(52) U.S. Cl.
CPC .......... *G06T 7/174* (2017.01); *G06K 9/00711* (2013.01); *G06K 9/4628* (2013.01); *G06K 9/627* (2013.01); *G06K 9/6296* (2013.01); *G06N 3/04* (2013.01); *G06T 7/55* (2017.01); *G06T 7/579* (2017.01); *G06T 7/75* (2017.01); *G06T 17/00* (2013.01); *H04N 5/247* (2013.01); *H04N 13/261* (2018.05); *G06T 2207/10016* (2013.01); *G06T 2207/10021* (2013.01); *G06T 2207/10024* (2013.01); *G06T 2207/10028* (2013.01); *G06T 2207/20076* (2013.01); *G06T 2207/30244* (2013.01)

(58) Field of Classification Search
CPC . G06T 7/174; G06T 7/55; G06T 2207/10016; H04N 13/261; G06K 9/6296; G06N 3/04
See application file for complete search history.

(56) References Cited

U.S. PATENT DOCUMENTS

| | | | |
|---|---|---|---|
| 2010/0046830 A1* | 2/2010 | Wang | G06T 7/12 382/164 |
| 2017/0132758 A1* | 5/2017 | Paluri | G06K 9/00744 |
| 2017/0193706 A1* | 7/2017 | Lo | G06F 3/03547 |

(Continued)

OTHER PUBLICATIONS

Curless, B. et al., "A Volumetric Method for Building Complex Models from Range Images", SIGGRAPH '96; Proceedings of the 23rd annual conference on Computer graphics and interactive techniques; pp. 303-312.

(Continued)

*Primary Examiner* — Michael E Teitelbaum
(74) *Attorney, Agent, or Firm* — Green, Howard, & Mughal LLP.

(57) ABSTRACT

A system, article, and method of recurrent semantic segmentation for image processing by factoring historical semantic segmentation.

23 Claims, 10 Drawing Sheets

(56) References Cited

U.S. PATENT DOCUMENTS

2018/0268548 A1* 9/2018 Lin .................... G06F 17/2715

OTHER PUBLICATIONS

Dai, A. et al., "Richly-annotated 3D Reconstructions on Indoor Scenes", IEEE Conference on Computer Vision and Pattern Recognition (CVPR), 2017, pp. 5828-5839.

Finman, R. et al., "Efficient Incremental Map Segmentation in Dense RGB-D Maps", Proceedings of International Conference on Robotics and Automation (ICRA), 2014, pp. 5488-5494.

He, K. et al., "Deep Residual Learning for Image Recognition", IEEE Conference on Computer Vision and Pattern Recognition, 2016, 9 pages.

McCormac, J. et al., "SemanticFusion: Dense 3D Semantic Mapping with Convolutional Neural Networks", IEEE International Conference on Robotics and Automation (ICRA), Singapore, 2017, 8 pages.

Newcombe, Richard A. et al., "KinectFusion: Real-Time Dense Surface Mapping and Tracking", Proceedings of the 2011 10th IEEE International Symposium on Mixed and Augmented Reality (ISMAR'11), pp. 127-136, Oct. 26, 2011, IEEE Computer Society, Washington.

Tateno, K. et al., "CNN-SLAM: Real-time dense monocular SLAM with learned depth prediction", IEEE Conference on Computer Vision and Pattern Recognition (CVPR), 2017, 10 pages.

Tateno, K. et al., "Real-time and scalable incremental segmentation on dense Slam", International Conference on Intelligent Robots and Systems (IROS), Hamburg, Germany, 2015.

Zhao, H. et al., "Pyramid Scene Parsing Network", Computer Vision and Pattern Recognition (CVPR), 2017, pp. 2881-2890.

* cited by examiner

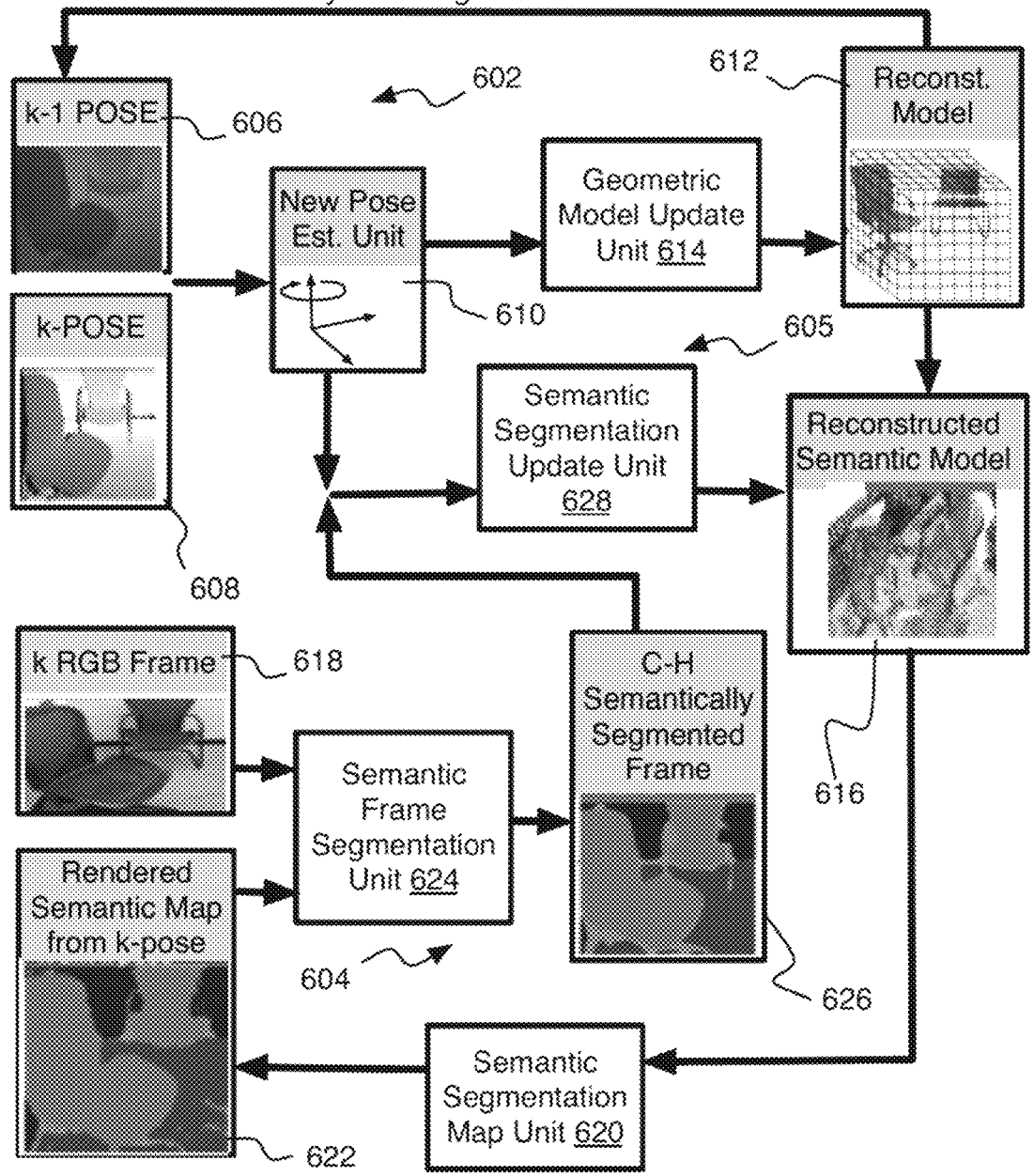

METHOD AND SYSTEM OF RECURRENT SEMANTIC SEGMENTATION FOR IMAGE PROCESSING

BACKGROUND

Computer-vision provides computers or automated machines with visual abilities. Thus, it is desirable in computer-vision to provide such systems with the ability to reason about the physical world by being able to understand what is being seen in 3D and from images captured by cameras for example. In other words, applications in robotics, virtual-reality (VR), augmented-reality (AR), and merged reality (MR) may need to understand the world around the robot or person providing the point of view in the applications. For example, a robot needs to understand what it sees in order to manipulate (grasp, move, etc.) objects. VR, AR, or MR applications need to understand the world around the person providing the point of view so that when the person moves in such a world, the person is shown to avoid obstacles in that world for example. This ability also permits such computer vision systems to add semantically plausible virtual objects to the world environment. Thus, a system that understands it is seeing a lamp, can understand the purpose and operation of the lamp. For these purposes, a 3D semantic representation of the world in the form of a semantic segmentation model (or just semantic model) may be formed by using 3D semantic segmentation techniques.

Such semantic segmentation techniques often involve constructing a 3D geometric model, and then constructing a 3D semantic model based on the geometric model where the 3D semantic model is formed of voxels that are each assigned definitions for the object those voxels are part of in a 3D space, such as furniture like "chair", "sofa", "table", or parts of the room, such as "floor" or "wall", and so forth. The 3D semantic model is updated over time by segmenting a current frame to form a segmented frame, and registering the segmented frame to the model either based on heuristic rules or a Bayesian update as well as the current camera pose used to form the current frame. The semantic model then may be used by different applications, such as computer vision, to perform tasks or analysis of the 3D space as described above.

Such updating of the semantic segmentation model, however, is often inaccurate and results in low performance because it does not adequately factor the history of the semantic updating. In other words, the semantic segmentation is often updated a frame at a time. A current frame is semantically segmented to form a segmented or label frame, and this is repeated for individual current frames in a video sequence. Each semantically segmented frame, depending on a camera (or sensor) pose used to form the current frame, are then used to update the semantic model. This is typically performed without factoring the sequence or history of semantic updating that occurred previously during a video sequence while performing the semantic segmentation of the current frame to form the segmented frame. This results in a significantly less accurate analysis resulting in errors and inaccuracies in semantic assignments to vertices or voxels in the semantic model.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 6 is a schematic diagram of a system for performing semantic segmentation of images in accordance with the implementations herein;

DETAILED DESCRIPTION

Figure 1:
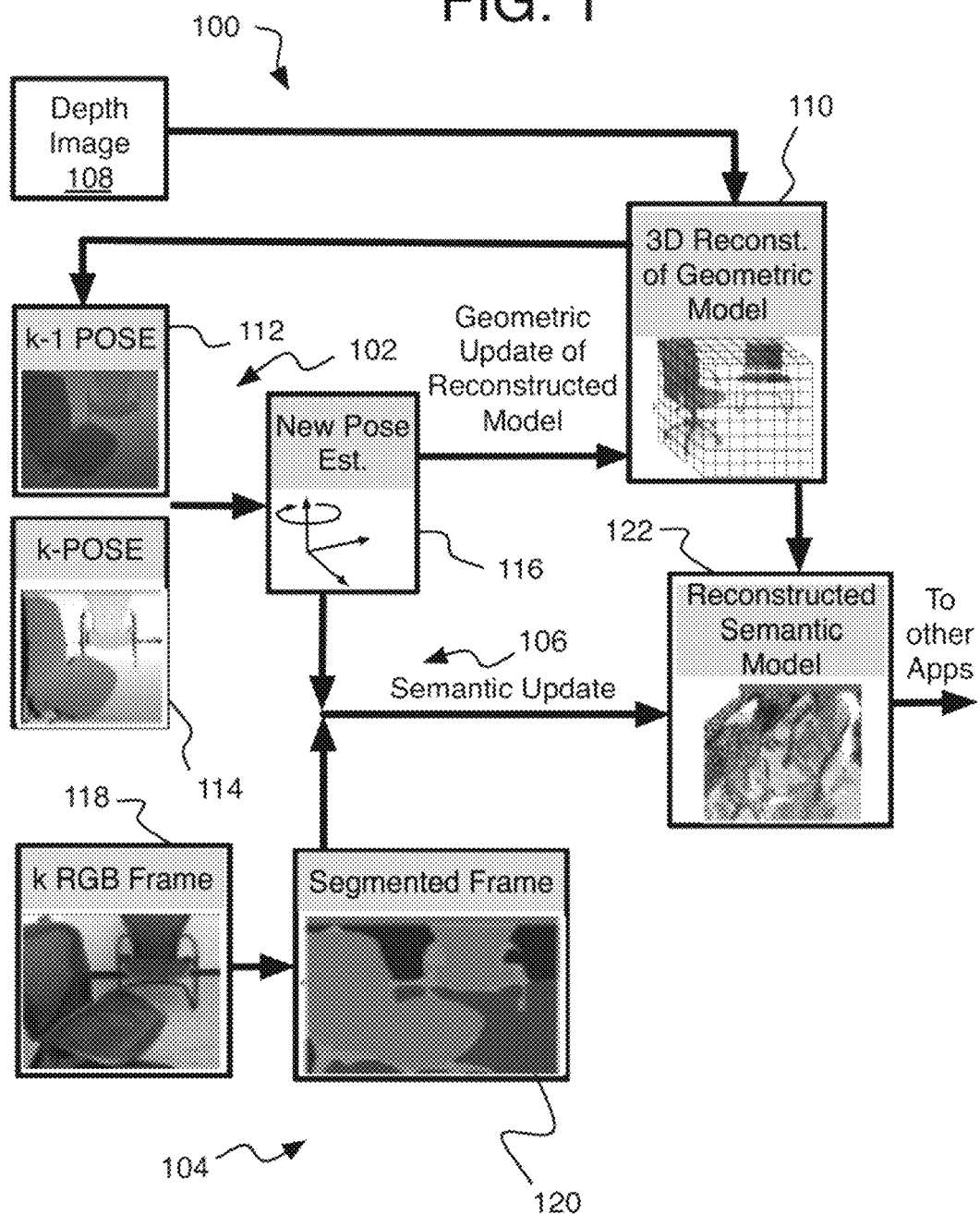
FIG. 1 is a schematic flow diagram showing a method of conventional semantic segmentation.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, any of which may have light projectors and/or sensors for performing object detection, depth measurement, and other tasks, and may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide recurrent semantic segmentation for imaging processing.

As mentioned, computer-vision often is used to reason about the physical world. Applications in robotics, virtual-reality (VR), augmented-reality (AR), and merged reality (MR) may need to understand the world around the camera sensor, whether the camera sensor is on a robot or for point of view (POV) of a user. For example, a robot may need to understand what it sees in order to manipulate (grasp, move, etc.) objects. VR/AR/MR applications may need to understand the world in order to avoid obstacles as the user moves, and add semantically plausible virtual objects to the environment. For that purpose, a 3D semantic representation of the world in the form of a 3D semantic model may be used.

Referring to FIG. 1, some existing solutions perform 3D semantic segmentation using red-green-blue color scheme depth cameras (referred to as RGBD) that provide color and luminance image data as well as depth maps of the image. This may include obtaining images from a single (monocular) camera moving around a scene or stereo systems that use multiple cameras to capture the same scene from different angles. Generally, the 3D semantic segmentation may first include the construction of a 3D geometric model from the image and depth data and then registering semantically segmented images onto the geometric model to form a 3D semantic model. Thus, while referring to FIG. 1, a 3D semantic segmentation process 100 may be performed in three main operations: (1) a first geometric stage or pipeline 102 that uses a dense RGBD simultaneous localization and mapping (RGBD-SLAM) algorithm for 3D geometric reconstruction, (2) a second stage 104 that performs semantic segmentation based on a current frame, and (3) a third semantic model update stage 106 that performs an update of the 3D semantic model (either based on heuristic rules or a Bayesian update).

As to the 3D geometric model generation operation 102, it may have two parts: (i) finding the camera position of individual frames, and (ii) mapping the environment around the camera. By one example form, and initially, this may involve obtaining an input depth image or depth map 108 of the current frame formed by triangulation for example, and in addition to the chroma or luminance data, such as RGB data, generally referred to herein as image data of the current frame, or the current frame itself. The depth map 108 and the current frame then may be used to form a 3D geometric model 110 of the scene being captured by the camera(s). The 3D geometric model 110 may be a stored 3D volumetric grid by one example. At first, a 3D rendered image 112 of the model 110 can be rendered by raycasting a previously known camera-position (k−1 pose) onto an image plane of the model 110. The previously known camera position may be a pose of a first or just previous frame to the current frame being analyzed. Thereafter, each or individual new current frames 114 at k-pose are registered to one of the rendered images 112 at k−1 (or previous) pose of the model 110 to compute a new camera position or pose estimate 116. Specifically, the current frame 114 may be registered to the model's rendering 112 using an iterative-closest point (ICP) algorithm. The ICP algorithms may be used to compute a rigid transformation (rotation and translation) between the model rendering 112 and the current frame 114. This transformation is then applied to the previous known camera position (k−1 pose) 112 to get the new camera position (New Pose Est.) 116. Given the new estimated camera position 116, the 3D location of each pixel in the world is known relative to that new position 116. Then, the geometric model 110 may be updated with point or vertex position data of the new pose estimate 116. In turn, the volumetric semantic representation or geometric model 122 may be updated in stages 2 and 3 (104 and 106) as is described below.

A number of different RGBD-SLAM algorithms may be used to perform the 3D geometric construction. A dense RGBD-SLAM algorithm may use a 3D reconstruction algorithm that builds a 3D model incrementally, referring to adding increments, or 3D sections, to the 3D geometric model 110 one at a time, and may be provided by different frame each time. Thus, new 3D points on each RGBD frame that arrives is registered to the existing model, and the model is updated in an incremental manner. See for example, Newcombe, et al., "KinectFusion: Real-time dense surface mapping and tracking", ISMAR (p./pp. 127-136), IEEE Computer Society (2011); and Finman et al., "Efficient Incremental Map Segmentation in Dense RGB-D Maps", Proc. Int. Conf. on Robotics and Automation (ICRA), pp. 5488-5494 (2014). Dense here refers to the relatively large number of points that can be used to build the model. The 3D geometric model may be represented as a volumetric grid by using a signed-distance-function (SDF) method. See Curless et al., "A Volumetric Method for Building Complex Models from Range Images", SIGGRAPH (1996). In such dense RGBD-SLAM incremental algorithms, real-time 3D reconstruction may be performed and by typically maintaining a model of the reconstructed scene locally in the memory of a device such as smartphones or AR headwear rather than remotely. However, dense RGBD-SLAM alone does not recover any semantic information about the model, and semantic segmentation typically involves very large computational loads such that it is usually performed remotely from small devices.

Particularly, as to the second stage (the semantic segmentation) 104, the semantic information can be captured with a semantic segmentation algorithm. Usually these semantic algorithms segment a single frame at a time, and semantic segmentation of temporal data, such as RGB or RGBD videos, is usually not based on 3D information. However, and as exemplified by 3D segmentation process 100, one example framework does combine a dense-SLAM algorithm with a 3D semantic segmentation algorithm. See Tateno et al., "Real-time and scalable incremental segmentation on dense SLAM", IROS (2015). This semantic segmentation process creates a 3D semantic model 122 that maintains the semantic label of each voxel.

Specifically, Tateno discloses projecting the current global model 122 to form a global model label map. Meanwhile, a current frame is used to form a current depth map, and this current depth map is segmented, and the segments are semantically labeled. By one form, this includes using connected component analysis algorithms to an edge map of the depth map, which may generate a current label map. This process then compares the current label map to the global model label map, by finding the segments that have the same semantic label, and comparing them to form a propagated label map. The propagated label map may be modified by merging adjacent segments with the same label.

In the updating third stage 106 for those system that perform semantic segmentation without 3D data, the rendering or new pose estimate 116 is then compared to (or registered to) the semantic segmentation frame 120 formed by using the current frame 118, and the model 122 is updated by a heuristic (or voting), Bayesian, or other similar method. In Tateno where 3D data is used, the updating is accomplished by using the propagated label map to update the global model depending on a cumulated confidence score for the semantic labels of each segment.

Initially, Tateno used geometric plane-based segmentation which was later replaced by a deep-learning semantic segmentation algorithm. See, Tateno et al., "CNN-SLAM: Real-time dense monocular SLAM with learned depth prediction," arXiv preprint arXiv:1704.03489 (2017). In McCormac et al., this idea is expanded and per-semantic class confidence scores are maintained rather than keeping a single semantic label for each voxel. See, McCormac et al. "SemanticFusion: Dense 3D Semantic Mapping with Convolutional Neural Networks," arXiv preprint arXiv:1609.05130 (2016). Per-class confidence scores are updated on the fly whenever new observations are available. As mentioned for these Tateno systems, the semantic segmentation algorithm is applied to a single image 118 and later propagated to the model 122 to update the model.

These conventional 3D segmentation systems have a number of difficulties. For those systems that merely independently analyze one frame at a time, the semantic segmentation is often inadequate mainly due to an insufficient amount of data resulting in noise and errors such as jumps, inconsistency, and incorrect segment labels as a video frame is being analyzed for semantic segmentation. Such systems cannot adequately handle significant changes in voxel data due to variations in image data over time such as with videos of moving objects or quickly moving cameras.

Further, since the conventional semantic segmentation of the current frame does not factor the semantic segmentation from previous frames, the global model updating, if it is present at all such as in Tateno, is limited to local analysis where one current segment label is compared to one global label as described above for Tateno. It does not have the capacity to perform a historical global (here global referring to an entire frame) analysis to determine if the changes to the distribution of image data over an entire frame indicates certain semantic labels on a specific segment. Such distributions may capture when certain labels are seen together on the same frame, such as a car and a road, or a chair and table, thereby substantially increasing the efficiency of the classification. Thus, if a frame has changing image data over time (frame to frame) on the conventional system thereby changing the distribution of the image data throughout large areas of a frame over time, this data in the conventional system does not necessarily have an effect on the probabilities of the semantic labels for semantic segmentation of a specific segment at a current location on the frame in the Tateno system. This results in significantly less accurate semantic segmentation since such known systems cannot accurately label when large unknown variations in segment data occur as mentioned above.

Moreover, in existing solutions, the update step is usually based on deterministic rules and is slow to adapt, or cannot adapt at all, to specific scenarios or data of particular situations. Similar to above, such rules are limited to local rather than global analysis. For example, semantic segmentation is often restricted to heuristics or Bayesian operations when using a current pose to modify a semantically segmented frame to update the semantic model. However, such rules do not consider data from other segments nor the entire frame and over time such that the distribution of the data over wide areas of a frame over time are not considered. Thus, such strict rules cannot factor for relatively large variations in segment data either, including those variations over time (from frame to frame), that could be used to form more accurate labels.

Also, since more data is added to the 3D semantic model each time a frame is added, the computational complexity and size of the network being handled to perform the semantic segmentation can be too large to be handled on a small device due to the limited memory, processing capacity, and power capacity of such devices when the system analyzes the entire 3D semantic model to perform the 3D semantic segmentation. Thus, much of 3D segmentation is performed offline resulting in unreasonable delay from transmissions to and from such a device. Thus, such systems are not suitable for real-time applications on small devices. The functioning of such devices or computers may be improved with more efficient semantic segmentation that reduces the computational load, and therefore memory and power capacity, used for semantic segmentation thereby permitting the sematic segmentation to be performed on smaller devices. One such solution is an incremental algorithm provided by Finman et al., cited above, which discloses only improving newly added sections of the model rather than the entire model. This solution, however, is still inadequate since the model still may grow too large with each added frame, and the already existing model data is not sufficiently updated such that errors and inaccuracies occur.

Finally, since Tateno merges segments on the propagated label map before updating the global model, it cannot reverse this process before providing a final label and updating the global model. This may maintain inaccuracies of the segment labels when further analysis reconfirms an earlier segmentation where two united original segments should have been kept separate rather than being joined.

To resolve these issues, a system and method is disclosed herein that recurrently uses historical semantic data to perform semantic segmentation of a current frame and to be used to update a 3D semantic model. Historical here refers to the use of past semantic labeling on the 3D semantic model. A rendered semantic segmentation map is generated by using projection from the 3D semantic model and to represent that historical data, and the segmentation map may be provided in the same pose as the current frame being analyzed. The rendered segmentation map may be provided for each frame being analyzed to establish the recurrence.

Further, a recurrent 3D semantic segmentation algorithm is used by taking as input both the rendered semantic segmentation map of the model in addition to an input image of the current frame. The recurrent 3D semantic segmentation algorithm may include CNN-based architecture that receives this paired input to synergistically analyze the distribution of the image data on the input together. For example, using the whole frame enables the system to learn what classes appear together. When the system recognizes a table, it may easily recognize a chair, since it is expected to appear with a table, while the system will eliminate other objects more easily (for example, there is probably no horse in the image). The output of the system is an updated 3D representation (model) of the world with individual voxels of the model being semantically classified.

In the method and system disclosed herein, the recurrent 3D semantic segmentation algorithm may merge efficient geometric segmentation with the high performance 3D semantic segmentation. For example, using both dense SLAM (simultaneous localization and mapping) based on RGB-D data (data from RGB and depth cameras, e.g., Intel RealSense depth sensors) and the semantic segmentation with convolutional neural networks (CNN) in a recurrent way as described herein. Thus, the 3D semantic segmentation may include: (i) dense RGBD-SLAM for 3D reconstruction of geometry; (ii) CNN-based recurrent segmentation which receives as an input the current frame and 3D semantic information from previous frames; and (iii) a copy of the results of (ii) to the 3D semantic model. It can be stated that operation (ii) uses the past frames and performs both segmentation and update of the model in a single-step. In other words, many conventional semantic segmentation systems perform a segmentation algorithm that obtains segment labels first, and then performs some sort of confidence value computation or comparison to thresholds to determine whether the semantic model should be updated with the semantic labels as in Tateno for example. Instead, the present system performs sufficiently accurate analysis with feature extraction and semantic segmentation neural networks to obtain the semantic segment labels so that such confidence value second step is unnecessary.

In the present solution, the recurrent segmentation operation (usage of the semantic information from previous frames as reflected in the 3D semantic model) is learned from the data and tailored to specific scenarios, and therefore, such solution is more accurate when the image data is changing quickly and for a greater variety of image data scenarios. Thus, such recurrence results in a high-quality and computationally efficient 3D semantic-segmentation system.

Figure 2:
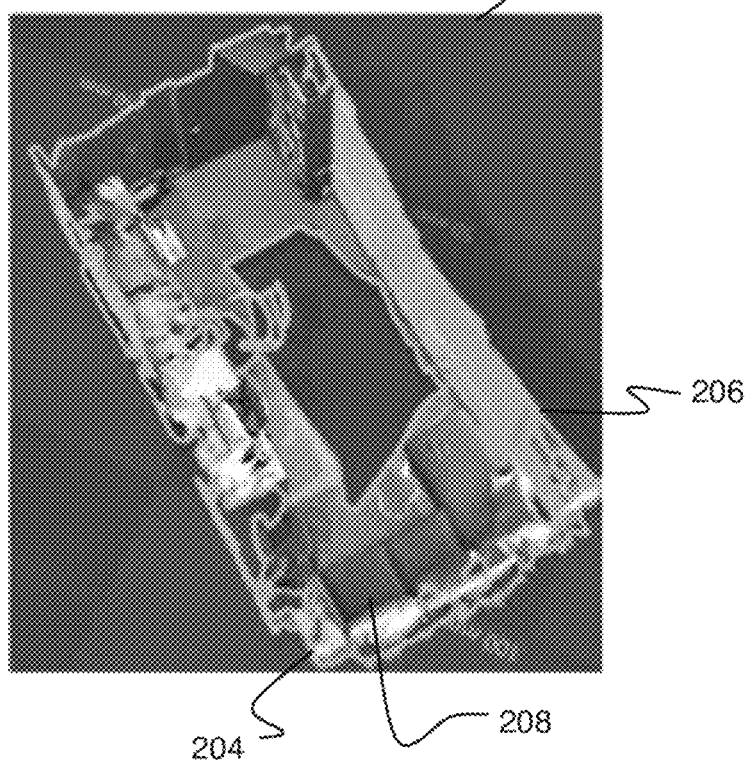
FIG. 2 is an illustration of an image with geometric segmentation.

Referring to FIG. 2 for example, an image 200 shows an exposed upper view of a room 202 with a highlighted border 206 between the room 202 and a background 204 to show geometric segmentation. The room 202 has fixtures and furniture 208 that also may be geometrically segmented from each other and the background.

Figure 3:
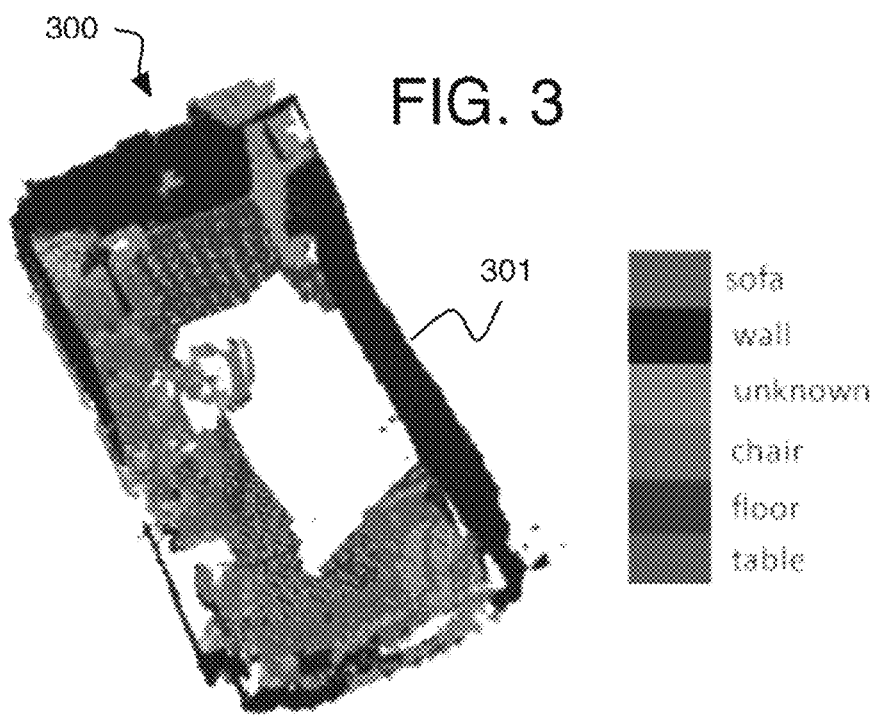
FIG. 3 is an illustration of a semantic segmentation of an image by labeled classifications.

Referring to FIG. 3, an image 300 shows the room 202 (now 301) from image 200 except now with the disclosed example 3D semantic segmentation applied. Each voxel color or shade represents a class of an object that it belongs to. With such semantic segmentation, actions can be taken depending on the semantic label of the segment whether for computer vision or other applications such as with virtual or augmented reality for example.

In the disclosed system and method, these two tasks as applied to the room 202 are merged into a joint framework that is computationally efficient and produces high quality 3D semantic segmentation as described herein. Further, unlike typical semantic segmentation algorithms that operate on a single frame, the disclosed methods use an algorithm that takes advantage of the timewise incremental nature of scanning an environment from multiple viewpoints in order to improve the segmentation and build a 3D model which is augmented with semantic information. Such a semantic segmentation process may be a timewise incremental semantic segmentation of an environment in which the input may be an RGB-D stream of frames (streams from RGB camera and Depth sensor/camera).

Practical robotic and VR applications often need to work immediately as they are started, gather information about the visible environment, and incrementally improve the 3D semantic model over time. In addition, such an algorithm should cope with changes in the environment, that is, objects, furniture and people that are moving in the environment. Therefore, an offline reconstruction and segmentation algorithm cannot solve this problem, and a real-time incremental algorithm should be used. This is accomplished by using the semantic segmentation method described herein which effectively provides a timewise incremental process as disclosed herein as well.

In the disclosed solution, the per-frame computation time is a function of the number of pixels in that frame, and not of the entire history of frames or the model, and therefore this method is computationally efficient and can run in real-time on small devices. Particularly, the system, with its semantic segmentation network, merely receives a current image and rendered semantic map from the same image point of view as the input for the system that needs to be placed in memory for processor segmentation access. This rendered map represents the history of the 3D semantic model. Instead, conventional systems typically receive the entire 3D semantic model as the input and placed in accessible memory, and therefore, the entire history of the 3D semantic model. Thus, the input to the disclosed system herein is much smaller input than inserting the whole semantic model as additional input of the semantic segmentation network. Since the input is a fixed size of a frame for both the current frame and rendered segmentation map inputs, the computation time may be fixed and is independent of the size of the model. This further avoids an increase in computation time as the 3D semantic model grows, where the growth is explained above, and by avoiding reliance on the growing size of the model.

Finally, it will be noted that since the segmentation map is used to form the segmentation frame in the first place, and by input to one or more further neural network layers that considered the pixels individually, this process avoids problems with permanently merging segments too early as in Tateno.

Figure 4:
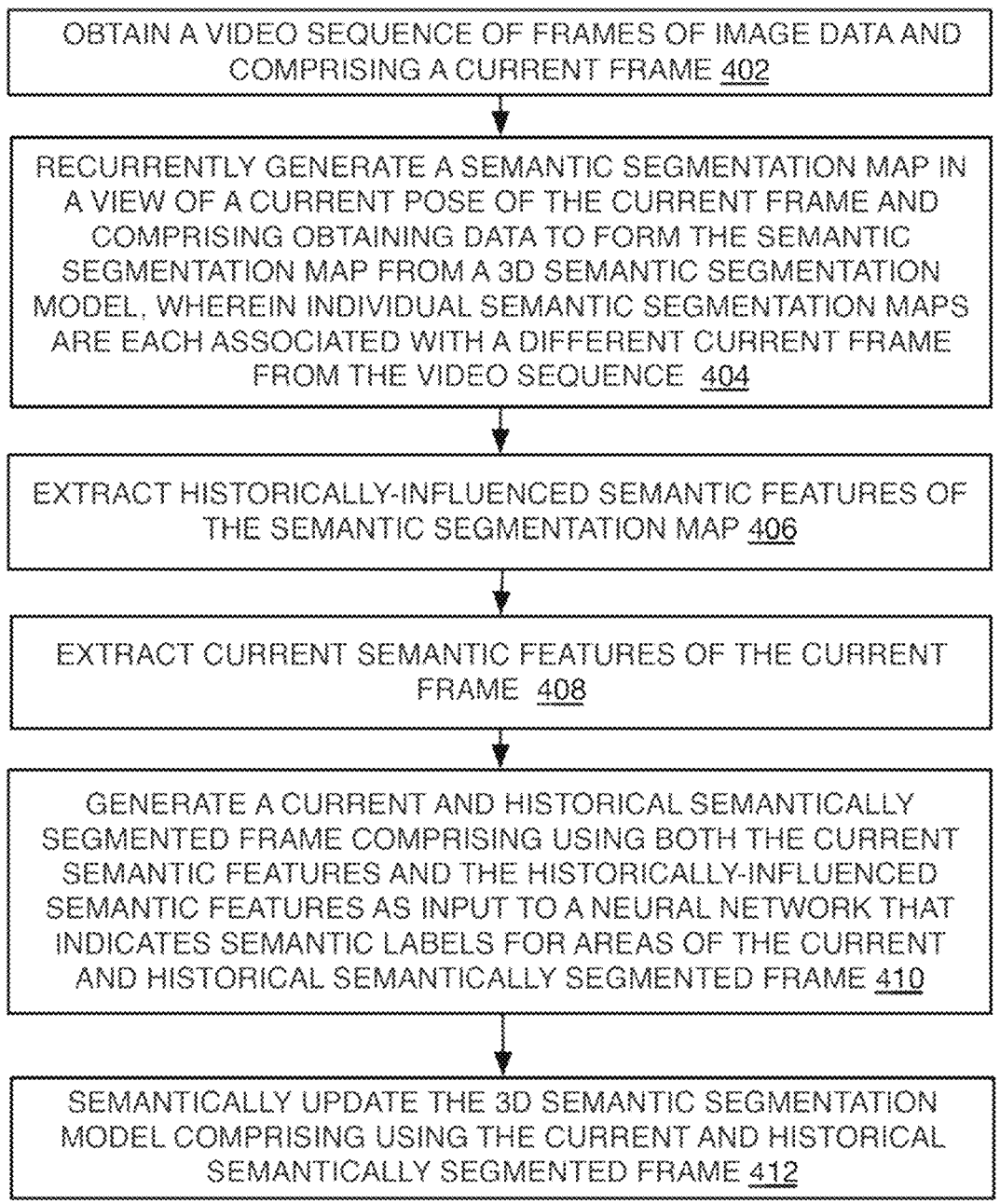
FIG. 4 is a flow chart of a method of semantic segmentation of images in accordance with the implementations herein.

Referring to FIG. 4, a process 400 is provided for a method and system of recurrent semantic segmentation for imaging processing. In the illustrated implementation, process 400 may include one or more operations, functions or actions 402 to 412 numbered evenly. By way of non-limiting example, process 400 may be described herein with reference to example image processing system 600 of FIG. 6 or system 900 of FIG. 9, and where relevant.

Process 400 may include "obtain a video sequence of frames of image data and comprising a current frame" 402. This operation may include obtaining pre-processed raw image data with RGB, YUV, or other color space values in addition to luminance values for a number of frames of a video sequence. The color and luminance values may be provided in many different additional forms such as gradients, histograms, and so forth. The pre-processing could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

This operation also may include obtaining depth data when the depth data is used for segmentation analysis. Depth image data may be determined by a stereo camera system, such as with RGBD cameras, that captures images of the same or moving scene from multiple angles. The system may perform a number of computations to determine a 3D space for the scene in the image and the depth dimension for each point, pixel, feature, or object in the image. Otherwise, other ways to determine three dimensions from a single camera are possible such as time-of-flight, and structural or coded light technologies.

Process 400 may optionally include "recurrently generate a semantic segmentation map in a view of a current pose of the current frame and comprising obtaining data to form the semantic segmentation map from a 3D semantic segmentation model, wherein individual semantic segmentation maps are each associated with a different current frame from the video sequence" 404. This may include generating a 3D semantic segmentation model, based on a 3D geometric model (generated by use of RGB-SLAM for example) with semantic labels registered to the model. Once established, the 3D semantic segmentation model may be projected to an image plane to form a segmentation map with the semantic labels from the model that have pixels or voxels on that plane. The image plane may be the plane formed by the camera pose of the current frame being analyzed. The 3D semantic segmentation model may be updated with semantic segment labels each current frame being semantically analyzed so that the 3D semantic model reflects or represents the history of the semantic segmentation of the 3D space represented by the 3D semantic model up to a current point in time. Thus, in turn, the semantic segmentation map will also represent this history of the segmentation.

Then, process 400 may include "extract historically-influenced semantically semantic features of the semantic segmentation map" 406, and therefore, an extraction algorithm may be applied to the segmentation map. The extraction algorithm may include a neural network such as a CNN with one or more layers and may be a ResNet neural network. The result of such extraction may be considered historically-influenced intermediate-value high level features that represent the semantic labeling in the segmentation map. In this case, the features are not semantic probability values or label classes. These features or feature values can eventually be used as inputs (or to compute inputs) to a further (or last) segmentation neural network that forms semantic probabilities for semantic classes and a pixel or other basis such as segments. The features may be in the form of tensors of matrices each formed of feature vectors of the features for example. More details are provided below. Since the segmentation map already has semantic values, this operation may be referred to as a refinement segmentation as well.

Meanwhile, process 400 may include "extract current semantic features of the current frame" 408, and this may include a current feature extraction algorithm, which also may be one or more neural network layers. This may be 3D or 2D data depending on the algorithm, and the results here also may be in the form of tensors of matrices of semantic feature vectors, and where the features are high level features or intermediate values rather than semantic classes or probabilities thereof.

Then, process 400 may include "generate a current and historical semantically segmented frame comprising using both the current semantic features and the historically-influenced semantic features as input to a neural network that indicates semantic labels for areas of the current historical semantically segmented frame" 410. This may occur in a number of different ways as long as both the current semantic features and the historically-influenced semantic features are input for analysis together such as input to a neural network, such as a CNN. Thus, the current semantic features and the historically-influenced semantic features may be combined, or by one example concatenated, before being input to the neural network together. This may include concatenating the features in the form of feature vectors, or matrices or tensors that include the feature vectors. By one form, one large tensor is formed with each concatenation of data of a 3D section of the current image and segmentation map outputs. In this example, the feature vectors from the two different sources are placed together in a single large feature vector and represent the same corresponding pixel locations on the current image and the segmentation map. Thus, this operation also may involve matching the features or the current frame and segmentation map to perform the concatenation, and this may be performed automatically simply by the order the data is fed to the system.

The concatenated data is then input to another or last segmentation neural network (or CNN by one example) with one or more layers. Thus, the distribution of data across a frame and over both the current and historical semantic data is analyzed together resulting in very accurate semantic segmentation. This output forms a segmentation frame of labels or probabilities of segments in the frame.

Process 400 may include "semantically update the 3D semantic segmentation model comprising using the current and historical semantically segmented frame" 412, which refers to registering the semantic labels or probabilities of the segmentation frame to the 3D semantic model. This may be performed by first projecting the segments of the segmentation frame into an image plane in the perspective of a new pose estimate from the geometric side of the system. Once in such a new pose estimate, that image and its semantic data is placed in the proper matching location in the 3D semantic model. This effectively registers the input RGBD frame to the 3D semantic model. The details for determining the new pose estimate are provided below.

Figure 5A:
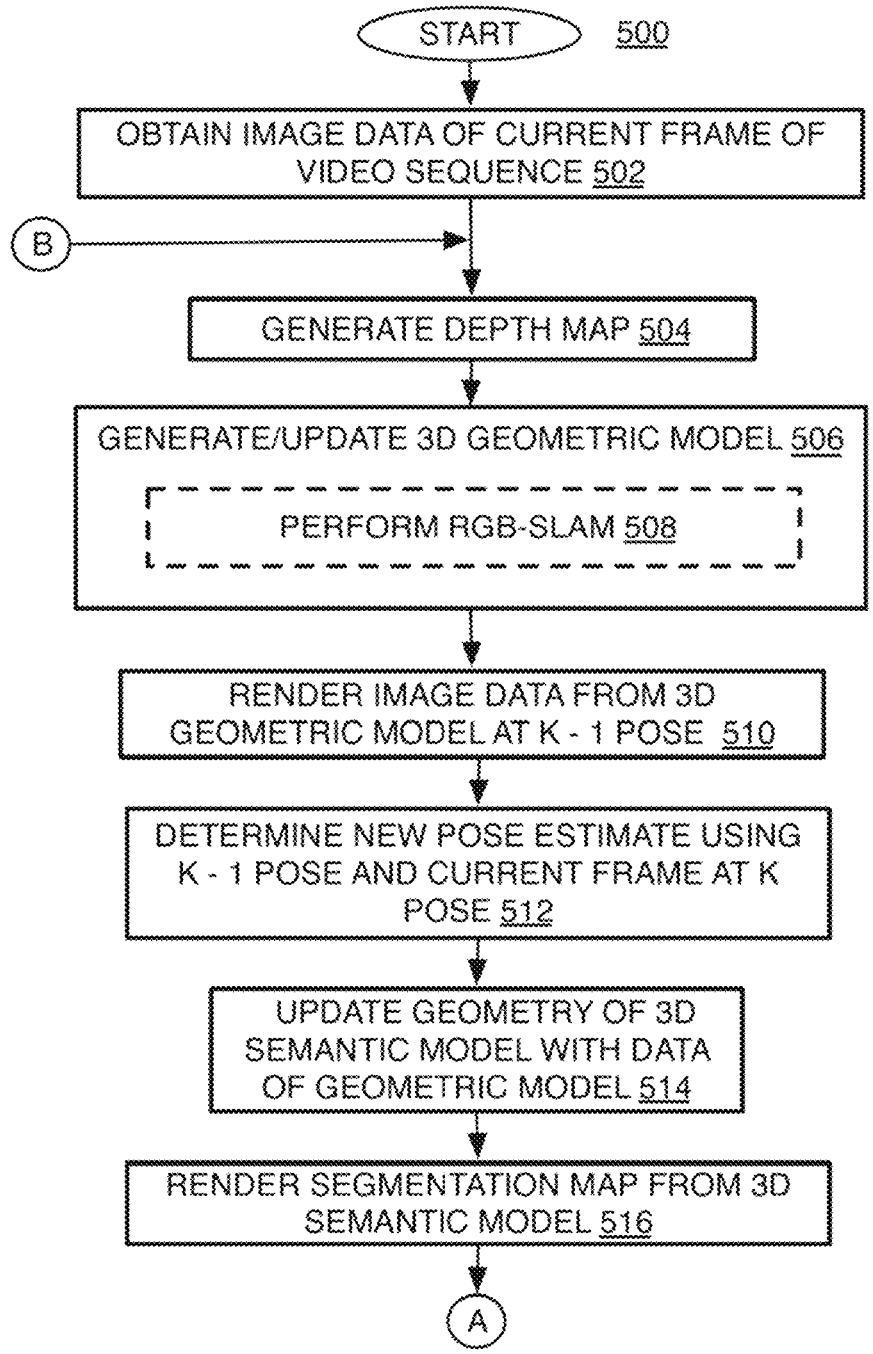
FIGS. 5A-5B is a detailed flow chart of a method of semantic segmentation of images in accordance with the implementations herein.
Figure 5B:
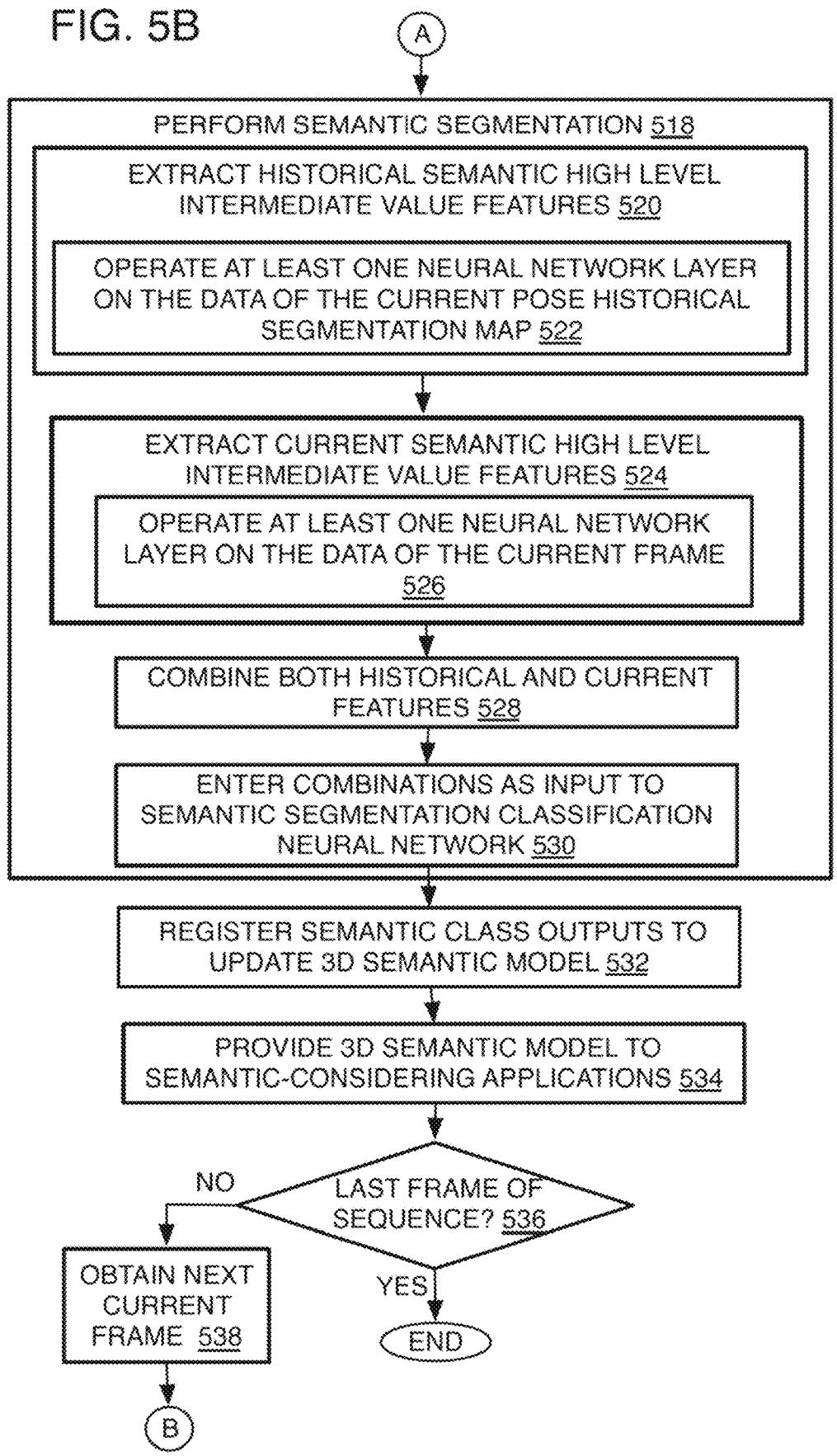

Referring to FIGS. 5A-5B, a process 500 is provided for a method and system of recurrent semantic segmentation for imaging processing. In the illustrated implementation, process 500 may include one or more operations, functions or actions 502 to 538 numbered evenly. By way of non-limiting example, process 500 may be described herein with reference to example image processing system 600 of FIG. 6 or system 900 of FIG. 9, and where relevant.

Figure 8:
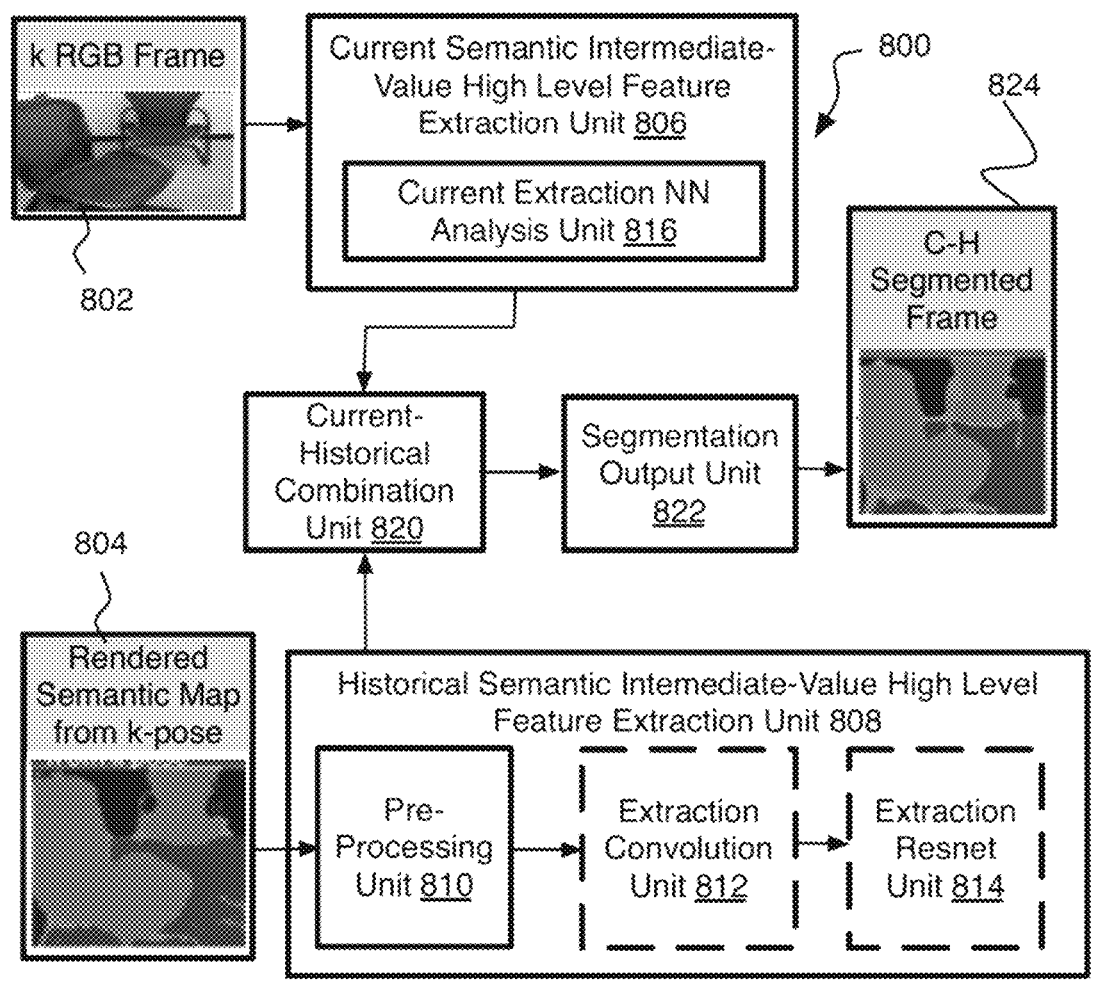
FIG. 8 is a semantic segmentation unit of the system of FIG. 6 in accordance with the semantic segmentation implementations disclosed herein.

Referring to FIGS. 6 and 8, particularly, process 500 may be operated by a semantic segmentation system 600 that has units that can be associated with three main operations or stages: geometric segmentation 602, semantic segmentation 604, and semantic updating of the 3D semantic model 605. As mentioned above, the system 600 may be a combination of geometric segmentation 602 such as by an RGB-SLAM algorithm as described above and that provides the basis for a 3D semantic model 616. The semantic model 616 is updated or reconstructed by performing semantic segmentation 604.

For the first geometric segmentation stage 602, the system 600 may have a new pose estimate unit 610 that receives a current image 608 at a k-pose and a rendered image 606 at k−1 pose. The rendered image 606 is generated by raycasting from a 3D geometric reconstructed model 612. A geometric model update unit 614 then uses the new pose estimate to update the 3D geometry of the geometric model 612. Other details are provided below with the description of process 500.

As to the semantic segmentation stage 604, the system 600 has a semantic segmentation map unit 620 that forms a segmentation map 622 at an image plane at the same pose as the current frame being analyzed and projected form the 3D semantic model 616. The projected or rendered semantic segmentation map 622, along with the RGB image data of the current frame 618 at k-pose are provided to a semantic frame segmentation unit 624 to form a semantically segmented frame 626. The semantic frame segmentation unit 624 uses both inputs to use historical data to improve the accuracy of the semantic labels, and an example of the semantic frame segmentation unit 624 is provided by FIG. 8. The semantic frame segmentation unit 624 or 800 may have a historical semantic intermediate-value high level feature extraction unit (or historical extraction unit) 808 that performs an extraction of high level features on the segmentation map 804 (or 622). The historical extraction unit 808 may include a pre-processing unit 810, a convolution unit 812, and/or a ResNet unit 814, and are described below. These units actually may refer to certain functions and may not be separate chronological steps also as described below.

Likewise, a current semantic intermediate-value high level feature extraction unit (or current extraction unit) 806 may perform extraction of features on the current k RGB frame (or current frame at the k-pose). The current extraction unit 806 may have a current extraction neural network analysis unit 816 to perform the extraction with one or more neural network layers. For both the current semantic extraction and the historical semantic extraction, features in the form of feature vectors (or matrices or tensors) may be extracted and maybe provided to a current-historical combination unit 820. This unit may perform concatenation of the current and historical extracted feature vectors as described below. The concatenated, or otherwise combined, feature vectors are then used as input to a segmentation output unit 822 that has a last or further segmentation neural network. By one form, the concatenated features are in the form of tensors, and the features are fed to the last or further segmentation neural network together, one matrix of the tensor at a time. The segmentation output unit 822 outputs semantic labels, or class or probabilities for the labels or classes, and provides them as part of the current-historical (C-H) semantically segmented (or just segmented) frame 824.

Returning to the view of system 600, a semantic segmentation update unit at the update stage 605 may receive the segmented frame 626 or 824, and project the semantic data from the segmentation frame to an image plane at the new pose estimate from the new pose estimate unit 610 of the geometric stage 602. The update unit 628 may then register the indicated semantic class or labels of the segmented frame 626 at the new pose estimate onto the 3D segmentation model 616. Again, other details are provided below.

Now to the explanation of process 500, this method may include "obtain image data of current frame of video sequence" 502, and as mentioned above, may include obtaining raw RGB data, pre-processing the image data sufficient for geometric and semantic segmentation as well as other applications. The frame to be analyzed is considered the current frame, and each frame in a video sequence being analyzed may be considered the current frame. It will be understood that the segmentation may be applied to each frame in a video sequence or alternatively some interval of frames, such as every 5th or $10^{th}$ frame, or whatever interval has been found to reduce computational loads while still maintaining sufficiently accurate and timely 3D semantic segmentation for a video sequence. This may depend on the application using the segmentation.

Process 500 may include "generate depth map" 504, where a depth map for the current image may be formed to establish a 3D space for the video sequence being analyzed, and eventually used to generate a 3D geometric model. This may involve stereo depth generation or single camera depth generation.

Process 500 may include "generate/update 3D geometric model" 506, and also as mentioned above, the 3D geometric model, which may be operated by "performing RGB-SLAM" 508, or other methods, may initially be formed from one or more depth maps. By one form, such RGB-SLAM methods are used as disclosed in Newcombe, et al., "KinectFusion: Real-time dense surface mapping and tracking", ISMAR (pp. 127-136), IEEE Computer Society (2011). Thereafter, the 3D geometric model may be updated with each or individual current frames that are being analyzed. It should be noted that the system may update previously known portions of the geometric model with each current frame being analyzed. Thus, in the RGBD-SLAM here, each frame not only adds new portions, but also refines and improves already existing areas of the geometric models which are seen in the frame.

Process 500 may include "render image data from 3D geometric model at K−1 pose" 510, and this may include raycasting the 3D geometric model to an image plane formed when the camera is at the K−1 pose (herein K and k refer to the same thing and are used interchangeably).

Process 500 may include "determine new pose estimate using K−1 pose and current frame at K pose" 512, or in other words, the image data of the current frame captured when the camera is at the K pose and the image data of the frame captured when the camera was at the K−1 pose are used by a new pose estimate unit to determine the new pose estimate. This may be performed by iterative closest point (ICP) algorithms comparing the current image of the k-pose and a previous image at the k−1 pose.

Process 500 may include "update geometry of 3D semantic model with data of geometric model" 514. Here, the geometry of the 3D semantic model may be constructed by forming the voxel or 3D mesh structure by using the 3D vertex structure of the 3D geometric model to arrange the voxels and/or 3D mesh of the semantic model. Semantic labels are then added to the 3D semantic model as generated. By one example, the 3D semantic model is in the form of a voxel-grid or a 3D mesh with per-vertex semantic information. Other methods are contemplated as well.

Figure 7:
FIG. 7 is a close-up view of a portion of an image with semantic segmentation according to the semantic segmentation implementations disclosed herein.

Referring to FIG. 7, process 500 may include "render segmentation map from 3D semantic model" 516, and this may involve obtaining the k-pose of the current frame being analyzed, and then projecting the 3D semantic model to an image plane formed by a camera at the k-pose. An example segmentation map 700 is provided at the current pose (or k-pose) of the current frame, and where the walls 702, chairs 704, and floor 706 shown in the map 700 are segmented from each other and each have an initial, historically-based (or influenced or based on information of previous frames) semantic label (wall, chair, floor for example). In some forms, objects that are adjacent each other and have the same label may not show as separate components on the segmentation map.

Process 500 may include "perform semantic segmentation" 518. By the examples herein, the proposed method is not limited to any one specific type of CNN architecture. In a specific implementation, which was used in experiments, a pyramid scene parsing network (PSPNet) may be used and as described by Zhao et al, as the base semantic segmentation network architecture. See Zhao et al., "Pyramid Scene Parsing Network", Computer Vision and Pattern Recognition (CVPR) (2017).

Also, the recurrent segmentation may be performed on the fly, and while rendered semantic maps are not generated in advance. The neural networks used for the extraction and segmentation may be trained previously off-line before being provided for actual runs. The training is explained below. In practice, the system may run the segmentation on each $I_n^{th}$, (typically $I_n$=10) frame, instead of running it on each frame. The reasons for this are twofold: (i) the system can use a slow-to-compute segmentation architecture while the RGBD-SLAM algorithms keeps tracking the camera pose and updating the geometry of the model; and (ii) reduce the computational cost of the algorithm which improves the power efficiency of the system.

As part of the feature extraction, process 500 may include "extract historical semantic high level intermediate value features" 520. Here, feature extraction is performed on the semantic segmentation map, which already has semantic labels on the map from the 3D semantic model, and reflect the past semantic labeling on the 3D semantic model. This extraction may be performed separately from the extraction of features of the RGBD current image. Specifically, this may first involve a pre-processing operation by pre-processing unit 810 (FIG. 8) that converts the rendered semantic map input to an expected format for input to a neural network. By one example, each pixel may be represented by the top most likely semantic labels. Thus, by one form, the rendered semantic segmentation map frame may be provided in a structure of size W*H*3, where three top semantic classes are provided for each pixel, and being the top three classes in descending order of likelihood for example. The representation for a neural network then may be in a W*H*C structure (where W is width, H is height, and C is number of classes), or in other words, a tensor, so each pixel in the image is represented by a C size vector of different most-likely semantic classes. Each entry C represents one class, and the order may be constant (e.g., 1-chair, 2-table, 3-floor, etc.), and all other entries values are 0 except the three entries that represents the top 3 classes in the rendered map. By example, the entry that represents best class may have a probability value of ½, next may be ⅓, and next may be ⅙.

For this operation, process 500 may include "operate at least one neural network layer on the data of the current pose historical segmentation map" 522. Thus, the input mentioned above may be handed over for feature extraction as input to an extraction neural network that has at least one convolution layer and/or a ResNet layer(s) for propagation. As performed in one experiment, the system may apply separate convolutions and a ResNet building block with batch normalization to the semantic segmentation map input. See He et al., "Deep residual learning for image recognition", Proceedings of the IEEE Conference on Computer Vision and Pattern Recognition (CVPR) (2016). As mentioned, the output may be pixel, voxel, or segment level, high level features (or intermediate sematic values) in the form of modified feature vectors or tensors. These feature vectors may be provided for each or individual pixels (or pixel locations) throughout the rendered segmentation map being analyzed. By one form, the extraction neural network may be fed one W×H matrix of the tensor at time thereby providing one class value of the pixels at a time.

Likewise, process 500 may include "extract current semantic high level intermediate value features" 524, and this also may involve "operate at least one neural network layer on the data of the current frame" 526. Thus, this extraction also uses an extraction neural network such as CNNs with one or more layers as well. Here, however, the input to the current extraction neural network is image data from the current image which may be RGB data and/or YUV luminance data, depth data, or any combination of these, and so forth. The results also may be features or feature vectors placed into tensors to concatenate with the historical features and then to be used as input to the segmentation neural network.

Process 500 may include "combine both historical and current features" 528, and this may be provided by the current-historical combination unit 820 by one example. Here, the system concatenates or otherwise combine features that were extracted from the current frame, and features that were extracted from the historically-influenced semantic segmentation map. Specifically, results of both passes/branches may be tensors (three dimensional matrices), but can also be considered as vectors (matrix and tensors are simply generalization of a vector). To provide a simplified explanatory example, assume a result from the current frame extraction is a 3×1 feature vector (111, 222, 333) and a result from the extraction of the features from the semantic segmentation map is a 3×1 feature vector (444, 555, 666). At the concatenation stage, two feature vectors may be concatenated into a single 6×1 feature vector (111, 222, 333, 444, 555, 666). In this case, two output tensors P×M×N and Q×M×N are concatenated, and the result is a third tensor (P+Q)×M×N. The second and third dimensions may remain the same while the first dimension is a sum of sizes of both tensors. This resulting tensor may be provided as the input into a last or further neural network with one or more CNN layers (which may be referred to as a separate segmentation neural network or CNN) and which outputs semantic segmentation classes or probabilities thereof for pixels to be used to update the 3D semantic model as detailed next.

The resulting combinations or concatenations match features from the same location on the current frame and the rendered segmentation map. Thus, the result of the concatenation is a long vector where each vector represents an area in the image, and is the high level features of that given area in the image.

Process 500 then may include "enter combinations as input to semantic segmentation classification neural network" 530, and this may involve applying at least one convolution layer to the concatenated data in a last or further semantic segmentation neural network before updating the 3D semantic model, and may be provided by the segmentation output unit 822 (FIG. 8). By one example, a concatenated vector, tensor, or matrix is the input to the last neural network layer(s) and the output is the semantic class or label probabilities for each or individual segments (or voxels or pixels) on the segmentation frame. It will be understood that each voxel may have multiple labels, each with a probability, and could be all of the possible labels or classes. By one form, however, the semantic labels with the highest probabilities (such as three) may be kept for each voxel as explained herein.

Process 500 may include "register semantic class outputs to update 3D semantic model" 532, and this is performed by placing the semantic labels from the output of the last neural network layer and onto the matching segments or voxels of the 3D semantic segmentation model. In order to conserve memory, the top-X class candidate semantic labels may be stored at each voxel. The 3D semantic model consists of a truncated signed distance function for each voxel from RGBD-SLAM algorithm and a semantic data in the form of the top-X semantic classes. In the experiment referred to herein, X=3.

It will be understood that the method disclosed herein is performed in a timewise incremental manner since new data, and in turn new geographical area, is added to the 3D semantic model with each analysis of another frame. In contrast to Finman cited above, however, the new process also updates already existing areas on the 3D semantic model by using the historical data of the rendered segmentation map.

Process 500 may include "provide 3D semantic model to semantic-considering applications" 534, and as mentioned, may be computer vision applications, VR, AR, or MR headset applications, or any other application that can use the 3D semantic model.

Process 500 may include an inquiry "last frame of sequence?" 536, and if so, the process ends. Otherwise, process 500 may include "obtain next current frame" 538, when the video sequence has not ended yet. In this case, the image data of the new current frame is obtained and the process loops back to repeat at operation 504 to generate the depth map of the next current frame.

Training Procedure

The training of the above mentioned architecture in a supervised-learning settings may include a training set of RGBD video-sequences, where the frames in each sequence have semantic information. Such a video can be obtained using either (i) a labor intensive method manually segmenting each frame, (ii) segmenting a reconstructed 3D model, or (iii) using synthetic data. See, Dai at el., "Richly-annotated 3D Reconstructions of Indoor Scenes", Computer Vision and Pattern Recognition (CVPR) (2017).

In addition, training a recurrent network requires rendered semantic maps of the 3D semantic model. The training may be performed in several operations.

The first training operation may involve initialization by training a standard semantic-segmentation network. First, a standard single frame CNN-based semantic segmentation algorithm is trained. This resulting initial network may be denoted as $n_1$ for example.

The next training operation may involve data preparation, which refers to generating training data for the recurrent architecture. Given the current network, training data was generated for the next recurrent phase in the form of a triplet (RGBD frame, rendered semantic map of the 3D semantic model, ground truth semantic segmentation) in the following manner. The system runs as shown in FIGS. 6 and 8 with the current network on short sequences of N frames, where N is a tunable parameter. A matching semantic map was rendered for the last frame from the last camera pose in each sequence, and then saved with the frame as training data for next stage. The semantic map was represented as an image of H*W pixels (the size of the frame) with C (the number of classes that the system supports) channels. Since only X<C probabilities are remembered in each voxel, lower C-X probabilities are truncated to zero, and the remaining X probabilities are renormalized to be a proper distribution.

A further training operation then involves training the recurrent architecture. Given the new training data (RGBD frame, rendered semantic map of the model from the last camera pose, and ground truth semantic segmentation), training (or fine-tuning) is continued on the previous network with the additional branch, as described before, and operated as with FIG. 8. The data preparation and training of the recurrent architecture may be repeated for several iterations. The final network may be called $n_{final}$.

In addition, any one or more of the operations of FIGS. 4, and 5A-5B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
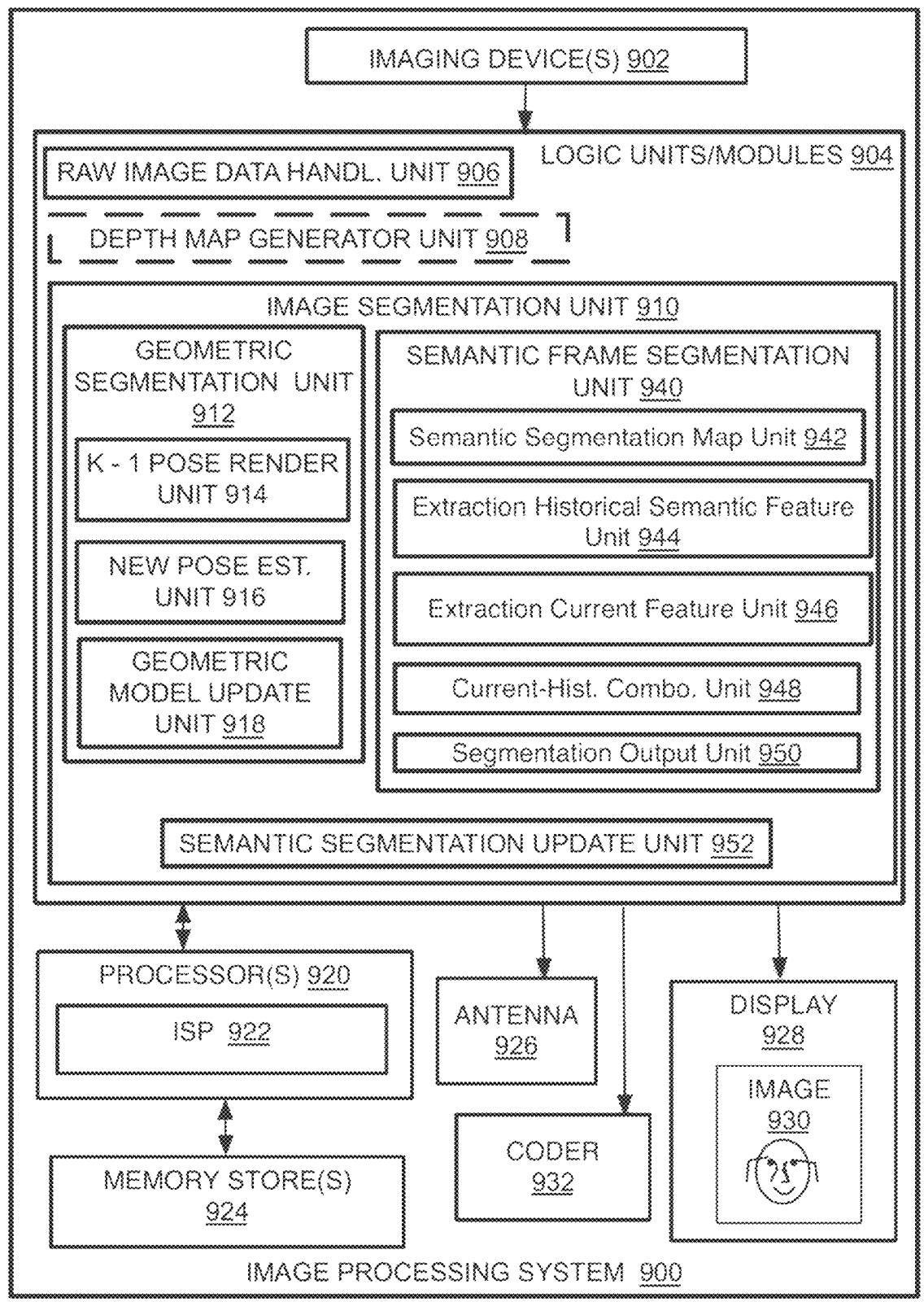
FIG. 9 is an illustrative diagram of an example system.

Referring to FIG. 9, an example image processing system 900 is arranged in accordance with at least some implementations of the present disclosure. In various implementations, the example image processing system 900 may have an imaging device 902 to form or receive captured image data. This can be implemented in various ways. Thus, in one form, the image processing system 900 may be one or more digital cameras or other image capture devices, and imaging device 902, in this case, may be the camera hardware and camera sensor software, module, or component. In other examples, imaging processing system 900 may have an imaging device 902 that includes or may be one or more cameras, and logic modules 904 may communicate remotely with, or otherwise may be communicatively coupled to, the imaging device 902 for further processing of the image data.

Thus, image processing system 900 may be a single camera alone or on a multi-camera device either of which may be a smartphone, tablet, laptop, or other mobile device, but particularly here could be computer vision cameras and sensors, and/or VR, AR, or MR headsets, glasses or other headwear positioned over a person's eyes. Otherwise, system 900 may be the device with multiple cameras where the processing occurs at one of the cameras or at a separate processing location communicating with the cameras whether on-board or off of the device, and whether the processing is performed at a mobile device or not.

In any of these cases, such technology may include a camera such as a digital camera system, a dedicated camera device, or an imaging phone or tablet, or other video camera, camera, including a headset that receives a smartphone for example, or some combination of these. Thus, in one form, imaging device 902 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 902 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In these examples, in addition to a camera sensor, the same sensor or a separate sensor may be provided as well as light projector, such as an IR projector to provide a separate depth image that can be used for triangulation with the camera image. Otherwise, the imaging device may have any other known technology for providing depth maps by using multiple camera or imaging devices, or a single imaging device.

In the illustrated example and relevant here, the logic modules 904 may include a raw image handling unit 906 that performs pre-processing on the image data sufficient for segmentation but also may be sufficient for generating a depth map or depth image, a depth map generation unit 908 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene).

The logic modules also may have an image segmentation unit 910 to perform many of the operations already described herein. Thus, for example, the segmentation unit 910 may have a geometric segmentation unit 912 that forms the new pose estimates and maintains the 3D geometric model as described above. A semantic frame segmentation unit 940 may be provided to perform the recurrent semantic segmentation as described above. To accomplish these tasks the geometric segmentation unit 912 may have a K-1 pose render unit 914, a new pose est. unit 916, and a geometric model update unit 918, and as described with similarly named units above or that perform easily recognized tasks as already described above. Similarly, the semantic frame segmentation unit 940 may have a semantic segmentation map unit 942, an extraction historical semantic feature unit 944, an extraction current feature unit 946, a current-historical combination unit 948, and a segmentation output unit 950 performing tasks as already described above. A semantic segmentation update unit 952 is provided to update a 3D semantic model with the semantic output of the segmentation output unit 952, also as described above.

The image processing system 900 may have one or more processors 920 which may include a dedicated image signal processor (ISP) 922 such as the Intel Atom, memory stores 924, one or more displays 928 to provide images 930, a coder 932, and antenna 926. In one example implementation, the image processing system 900 may have the display 928, at least one processor 920 communicatively coupled to the display, and at least one memory 924 communicatively coupled to the processor. The coder 932 may be an encoder, decoder, or both. As an encoder 932, and with antenna 934, the encoder may be provided to compress image data for transmission to other devices that may display or store the image. It will be understood that as a decoder, the coder may receive and decode image data for processing by the system 900 to receive images for segmentation in addition to, or instead of, initially capturing the images with the device 900. Otherwise, the processed image 930 may be displayed on display 928 or stored in memory 924. As illustrated, any of these components may be capable of communication with one another and/or communication with portions of logic modules 904 and/or imaging device 902. Thus, processors 920 may be communicatively coupled to both the image device 902 and the logic modules 904 for operating those components. By one approach, although image processing system 900, as shown in FIG. 9, may include one particular set of blocks or actions associated with particular components or modules, these blocks or actions may be associated with different components or modules than the particular component or module illustrated here.

Figure 10:
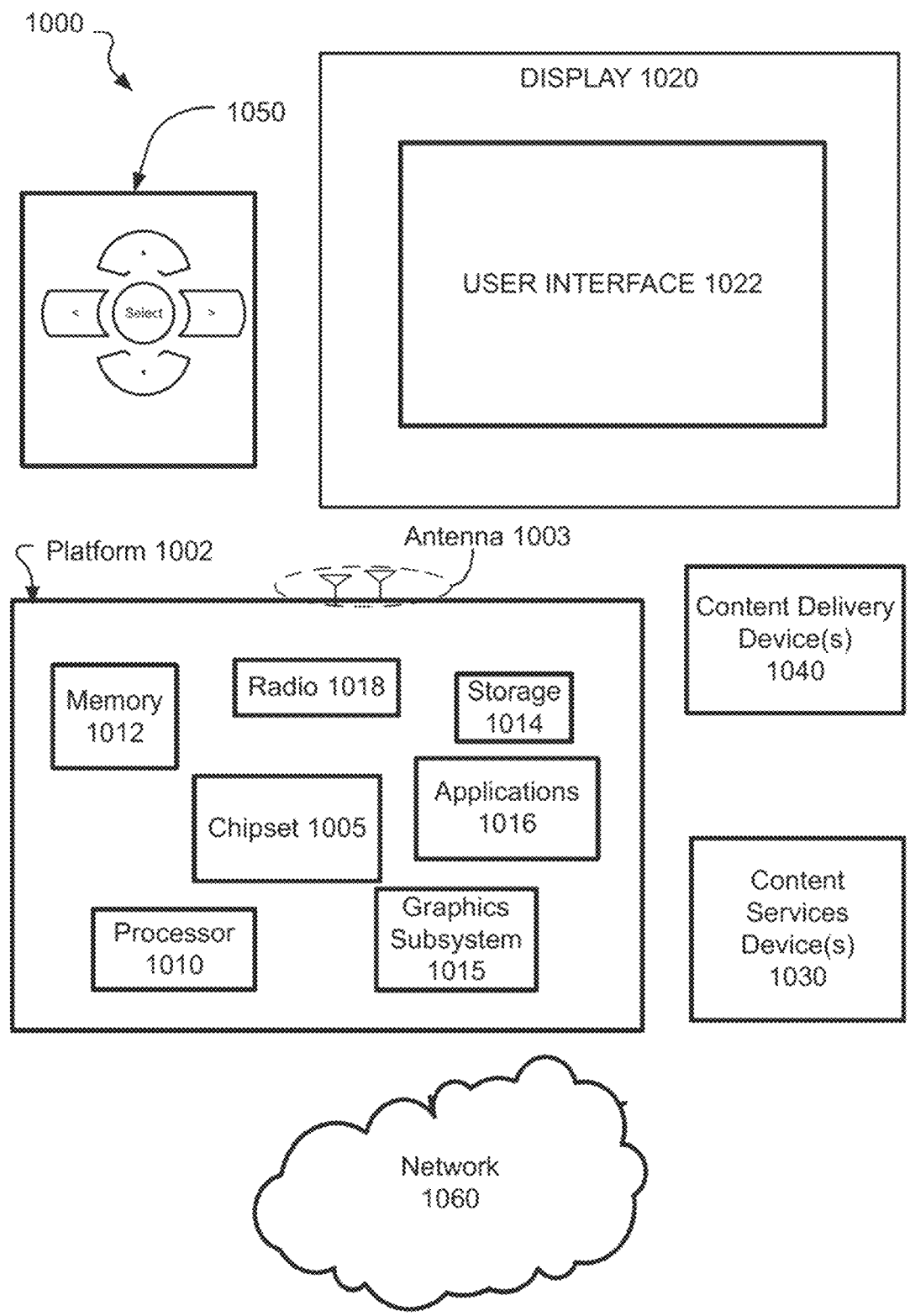
FIG. 10 is an illustrative diagram of another example system.

Referring to FIG. 10, an example system 1000 in accordance with the present disclosure operates one or more aspects of the image processing system described herein. It will be understood from the nature of the system components described below that such components may be associated with, or used to operate, certain part or parts of the image processing system 1000 described above, and therefore, used to operate the methods described herein. In various implementations, system 1000 may be a media system although system 1000 is not limited to this context. For example, system 1000 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas 1003, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
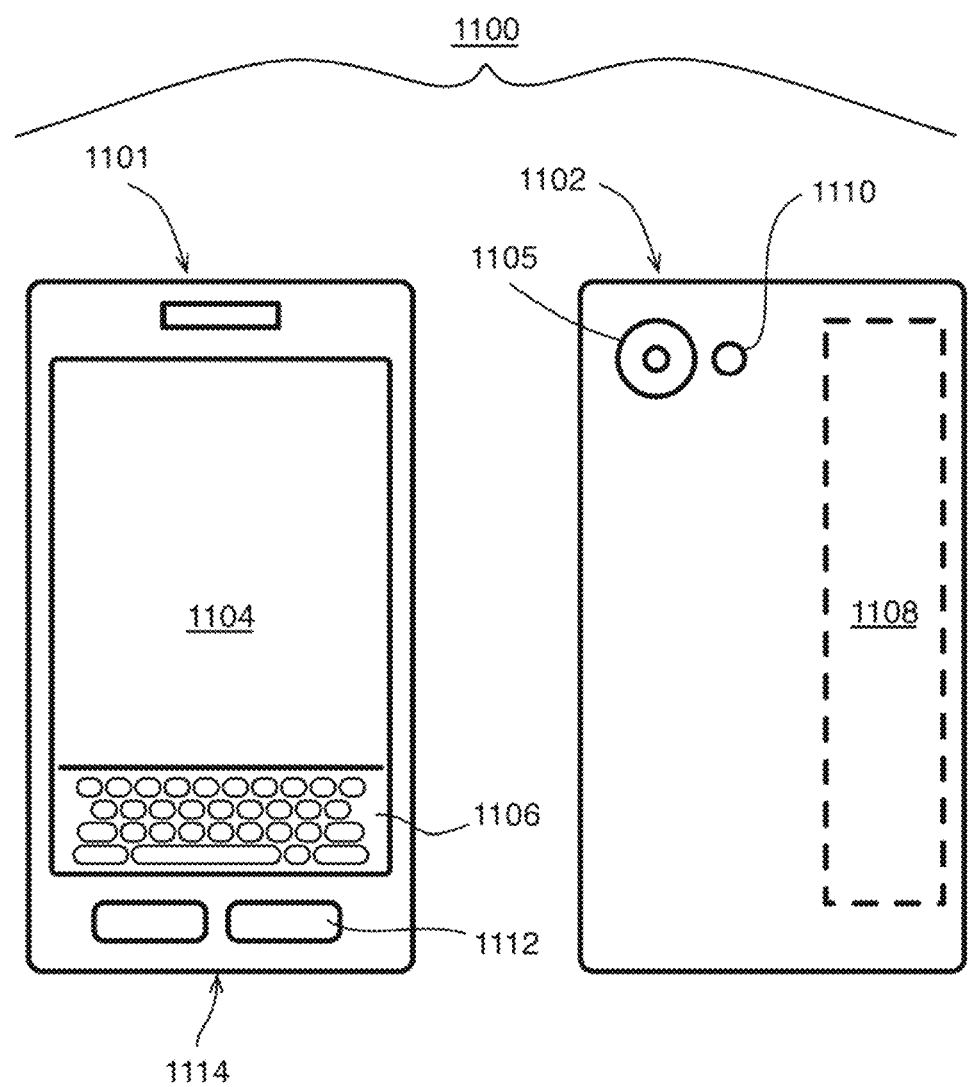
FIG. 11 illustrates another example device, all arranged in accordance with at least some implementations of the present disclosure.

Referring to FIG. 11, a small form factor device 1100 is one example of the varying physical styles or form factors in which systems 900 or 1000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone 1114, or may be digitized by a voice recognition device. As shown, device 1100 may include a camera 1105 (e.g., including at least one lens, aperture, and imaging sensor) and an illuminator 1110, such as those described herein, integrated into back 1102 (or elsewhere) of device 1100. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of semantic segmentation for image processing, comprising obtaining a video sequence of frames of image data and comprising a current frame; recurrently generating a semantic segmentation map in a view of a current pose of the current frame and comprising obtaining data to form the semantic segmentation map from a 3D semantic segmentation model, wherein individual semantic segmentation maps are each associated with a different current frame from the video sequence; extracting historically-influenced semantic features of the semantic segmentation map; extracting current semantic features of the current frame; generating a current and historical semantically segmented frame comprising using both the current semantic features and the historically-influenced semantic features as input to a neural network that indicates semantic labels for areas of the current and historical semantically segmented frame; and semantically updating the 3D semantic segmentation model comprising using the current and historical semantically segmented frame.

By another implementation, this method may comprise geometrically updating the 3D semantic segmentation model with data of individual current frames as the video sequence is being analyzed; and rendering an updated semantic segmentation map at a current pose of each current frame used to geometrically update the 3D semantic segmentation model, wherein extracting historically-influenced semantic features of the semantic segmentation map comprises inputting semantic segmentation label data from the semantic segmentation map to an extraction neural network and outputting the semantic features, the method comprising placing the semantic segmentation label data into the form of tensors where one of the dimensions of the tensor is multiple likely semantic labels for a single pixel location, wherein the neural network uses a convolutive neural network (CNN) that is a residual network (ResNet), wherein the current semantic features and the historical semantic features are both in the form of tensors wherein one of the dimensions of the tensor is multiple likely semantic labels for a single pixel location, and wherein generating the current and historical semantically segmented frame comprises concatenating the current semantic features and the historically-influenced semantic features to form an input feature vector with both the current semantic features and the historically-influenced semantic features and to be input to the neural network. The method comprising matching the image location of the current semantic features and the historically-influenced semantic features so that individual input feature vectors represent a single area of the image, wherein the feature vectors are a part of tensors, and the concatenation comprises tensor concatenation forming the input feature vectors; and the method comprising inputting a matrix at a time into the neural network and from the concatenated tensors, and wherein the 3D semantic segmentation model is geometrically updated by using a red, green, blue, depth scheme with simultaneous localization and mapping (RGBD-SLAM), the method comprising determining a new pose estimate by using both the current frame in a current pose and a rendered image from a previous pose, wherein the rendered image is obtained by raycast projection from a 3D geometric model separate from the 3D semantic segmentation model; providing the current and historical semantically segmented frame at the new pose estimate; and updating the 3D semantic segmentation model comprising registering semantic labels of the current and historical semantically segmented frame at the new pose estimate and to the 3D semantic segmentation model.

By a further implementation, a computer-implemented system of semantic segmentation for image processing, comprising at least one display; at least one memory; at least one processor communicatively coupled to the display and the memory; and a semantic segmentation unit operated by the at least one processor and to operate by: obtaining a video sequence of frames of image data and comprising a current frame; recurrently generating a semantic segmentation map in a view of a current pose of the current frame and comprising obtaining data to form the semantic segmentation map from a 3D semantic segmentation model, wherein individual semantic segmentation maps are each associated with a different current frame from the video sequence; extracting historically-influenced semantic features of the semantic segmentation map; extracting current semantic features of the current frame; generating a current and historical semantically segmented frame comprising using both the current semantic features and the historically-influenced semantic features as input to a neural network that indicates semantic labels for areas of the current and historical semantically segmented frame; and semantically updating the 3D semantic segmentation model comprising using the current and historical semantically segmented frame.

The system also may include wherein the semantic segmentation unit is to operate by geometrically updating the 3D semantic segmentation model with data of individual current frames as the video sequence is being analyzed, wherein the semantic segmentation unit is to operate by rendering an updated semantic segmentation map at a current pose of individual current frames used to geometrically update the 3D segmentation model, wherein extracting historically-influenced semantic features of the semantic segmentation map comprises inputting semantic segmentation label data from the semantic segmentation map to an extraction neural network and outputting the semantic features, wherein the semantic segmentation unit is to operate by placing the semantic segmentation label data into the form of tensors where one of the dimensions of the tensor is multiple likely semantic labels for a single pixel location, wherein the neural network uses a convolutive neural network (CNN) that is a residual network (ResNet), wherein generating the current and historical semantically segmented frame comprises concatenating the current semantic features and the historically-influenced semantic features to form an input feature vector with both the current semantic features and the historically-influenced semantic features and to be input to the neural network.

As another implementation, at least one computer-readable medium having stored thereon instructions that when executed cause a computing device to operate by: obtaining a video sequence of frames of image data and comprising a current frame; recurrently generating a semantic segmentation map in a view of a current pose of the current frame and comprising obtaining data to form the semantic segmentation map from a 3D semantic segmentation model, wherein individual semantic segmentation maps are each associated with a different current frame from the video sequence; extracting historically-influenced semantic features of the semantic segmentation map; extracting current semantic features of the current frame; generating a current and historical semantically segmented frame comprising using both the current semantic features and the historically-influenced semantic features as input to a neural network that indicates semantic labels for areas of the current and historical semantically segmented frame; and semantically updating the 3D semantic segmentation model comprising using the current and historical semantically segmented frame.

The instructions also may cause the computing device to include wherein generating the current and historical semantically segmented frame comprises concatenating the current semantic features and the historically-influenced semantic features to form an input feature vector with both the current semantic features and the historically-influenced semantic features and to be input to the neural network, wherein the instructions cause the computing device to operate by matching the image location of the current semantic features and the historically-influenced semantic features so that individual input feature vectors represent a single area of the image, wherein the feature vectors are a part of tensors, and the concatenation comprises tensor concatenation forming the input feature vectors; and the method comprising inputting a matrix at a time into the neural network and from the concatenated tensors, wherein the 3D semantic segmentation model is geometrically updated by using an red, green, blue, depth scheme with simultaneous localization and mapping (RGBD-SLAM), wherein the instructions cause the computing device to operate by determining a new pose estimate by using both the current image in a current pose and an image rendered from a previous pose, wherein the rendered image is obtained by raycast projection from a 3D geometric model separate from the 3D semantic segmentation model; providing the current semantically segmented frame at the new pose estimate; and updating the 3D semantic model comprising registering semantic labels of the current semantically segmented frame at the new pose estimate and to the 3D semantic model.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of semantic segmentation for image processing, comprising:
   obtaining a video sequence of frames of image data and comprising a current frame;
   recurrently generating a semantic segmentation map in a view of a current pose of the current frame and comprising obtaining data to form the semantic segmentation map from a 3D semantic segmentation model at least partly based on voxels, a 3D mesh, or three-dimensional coordinates of objects in the content of the frames, wherein individual semantic segmentation maps are each associated with a different current frame from the video sequence;
   extracting historically-influenced semantic features of the semantic segmentation map;
   extracting current semantic features of the current frame;
   matching an image location of the current semantic features and the historically-influenced semantic features to form an input feature vector that represents a single area of the image;
   generating a current and historical semantically segmented frame comprising using both the current semantic features and the historically-influenced semantic features in the input feature vector as input to a neural network that indicates semantic labels for areas of the current and historical semantically segmented frame; and semantically updating the 3D semantic segmentation model comprising using the current and historical semantically segmented frame.

2. The method of claim 1 comprising geometrically updating the 3D semantic segmentation model with data of individual current frames as the video sequence is being analyzed.

3. The method of claim 1 comprising rendering an updated semantic segmentation map at a current pose of each current frame used to geometrically update the 3D semantic segmentation model.

4. The method of claim 1 wherein extracting historically-influenced semantic features of the semantic segmentation map comprises inputting semantic segmentation label data from the semantic segmentation map to an extraction neural network and outputting the semantic features.

5. The method of claim 4 comprising placing the semantic segmentation label data into the form of tensors where one of the dimensions of the tensor is multiple likely semantic labels for a single pixel location.

6. The method of claim 4 wherein the neural network uses a convolutive neural network (CNN) that is a residual network (ResNet).

7. The method of claim 1 wherein the current semantic features and the historical semantic features are both in the form of tensors wherein one of the dimensions of the tensor is multiple likely semantic labels for a single pixel location.

8. The method of claim 1 wherein generating the current and historical semantically segmented frame comprises concatenating the current semantic features and the historically-influenced semantic features to form the input feature vector with both the current semantic features and the historically-influenced semantic features and to be input to the neural network.

9. The method of claim 8 wherein the feature vectors are a part of tensors, and the concatenation comprises tensor concatenation forming the input feature vectors; and the method comprising inputting a matrix at a time into the neural network and from the concatenated tensors.

10. The method of claim 1 wherein the 3D semantic segmentation model is geometrically updated by using a red, green, blue, depth scheme with simultaneous localization and mapping (RGBD-SLAM).

11. The method of claim 10 comprising determining a new pose estimate by using both the current frame in a current pose and a rendered image from a previous pose, wherein the rendered image is obtained by raycast projection from a 3D geometric model separate from the 3D semantic segmentation model;

providing the current and historical semantically segmented frame at the new pose estimate; and updating the 3D semantic segmentation model comprising registering semantic labels of the current and historical semantically segmented frame at the new pose estimate and to the 3D semantic segmentation model.

12. A computer-implemented system of semantic segmentation for image processing, comprising:

at least one display;
at least one memory
at least one processor communicatively coupled to the display and the memory; and
a semantic segmentation unit operated by the at least one processor and to operate by:

obtaining a video sequence of frames of image data and comprising a current frame;

recurrently generating a semantic segmentation map in a view of a current pose of the current frame and comprising obtaining data to form the semantic segmentation map from a 3D semantic segmentation at least partly based on voxels, a 3D mesh, or three-dimensional coordinates of objects in the content of the frames, wherein individual semantic segmentation maps are each associated with a different current frame from the video sequence;

extracting historically-influenced semantic features of the semantic segmentation map;

extracting current semantic features of the current frame;

matching an image location of the current semantic features and the historically-influenced semantic features to form an input feature vector that represents a single area of the image;

generating a current and historical semantically segmented frame comprising using both the current semantic features and the historically-influenced semantic features in the input feature vector as input to a neural network that indicates semantic labels for areas of the current and historical semantically segmented frame; and semantically updating the 3D semantic segmentation model comprising using the current and historical semantically segmented frame.

13. The system of claim 12 wherein the semantic segmentation unit is to operate by geometrically updating the 3D semantic segmentation model with data of individual current frames as the video sequence is being analyzed.

14. The system of claim 12 wherein the semantic segmentation unit is to operate by rendering an updated semantic segmentation map at a current pose of individual current frames used to geometrically update the 3D segmentation model.

15. The system of claim 12 wherein extracting historically-influenced semantic features of the semantic segmentation map comprises inputting semantic segmentation label data from the semantic segmentation map to an extraction neural network and outputting the semantic features.

16. The system of claim 15 wherein the semantic segmentation unit is to operate by placing the semantic segmentation label data into the form of tensors where one of the dimensions of the tensor is multiple likely semantic labels for a single pixel location.

17. The system of claim 15 wherein the neural network uses a convolutive neural network (CNN) that is a residual network (ResNet).

18. The system of claim 12 wherein generating the current and historical semantically segmented frame comprises concatenating the current semantic features and the historically-influenced semantic features to form an input feature vector with both the current semantic features and the historically-influenced semantic features and to be input to the neural network.

19. At least one non-transitory computer-readable medium having stored thereon instructions that when executed cause a computing device to operate by:

obtaining a video sequence of frames of image data and comprising a current frame;

recurrently generating a semantic segmentation map in a view of a current pose of the current frame and comprising obtaining data to form the semantic segmentation map from a 3D semantic segmentation model at least partly based on voxels, a 3D mesh, or three-dimensional coordinates of objects in the content of the frames, wherein individual semantic segmentation maps are each associated with a different current frame from the video sequence;

extracting historically-influenced semantic features of the semantic segmentation map;

extracting current semantic features of the current frame;

matching an image location of the current semantic features and the historically-influenced semantic features to form an input feature vector that represents a single area of the image;

generating a current and historical semantically segmented frame comprising using both the current semantic features and the historically-influenced semantic features in the input feature vector as input to a neural network that indicates semantic labels for areas of the current and historical semantically segmented frame; and semantically updating the 3D semantic segmentation model comprising using the current and historical semantically segmented frame.

20. The medium of claim 19 wherein generating the current and historical semantically segmented frame comprises concatenating the current semantic features and the historically-influenced semantic features to form the input feature vector with both the current semantic features and the historically-influenced semantic features and to be input to the neural network.

21. The medium of claim 20 wherein the feature vectors are a part of tensors, and the concatenation comprises tensor concatenation forming the input feature vectors; and the method comprising inputting a matrix at a time into the neural network and from the concatenated tensors.

22. The medium of claim 19 wherein the 3D semantic segmentation model is geometrically updated by using an red, green, blue, depth scheme with simultaneous localization and mapping (RGBD-SLAM).

23. The medium of claim 22 wherein the instructions cause the computing device to operate by determining a new pose estimate by using both the current image in a current pose and an image rendered from a previous pose, wherein the rendered image is obtained by raycast projection from a 3D geometric model separate from the 3D semantic segmentation model;

providing the current semantically segmented frame at the new pose estimate; and updating the 3D semantic model comprising registering semantic labels of the current semantically segmented frame at the new pose estimate and to the 3D semantic model.

* * * * *